United States Patent
Rampp

[11] Patent Number: 5,727,359
[45] Date of Patent: Mar. 17, 1998

[54] WRAPPING TABLE AND REFUSE PACKAGING APPARATUS

[75] Inventor: Erwin Rampp, Wolfertschwenden, Germany

[73] Assignee: Altvater RPP 1200 GmbH, Germany

[21] Appl. No.: 611,423

[22] Filed: Mar. 6, 1996

[30] Foreign Application Priority Data

Nov. 15, 1995 [DE] Germany .................. 195 42 645.2

[51] Int. Cl.⁶ .................................................. B65B 11/04
[52] U.S. Cl. ........................... 53/211; 53/215; 53/587
[58] Field of Search .......................... 53/587, 588, 211, 53/215; 100/15; 56/341, 343

[56] References Cited

U.S. PATENT DOCUMENTS

| | | | |
|---|---|---|---|
| 4,281,500 | 8/1981 | Mueller et al. | 53/587 X |
| 4,333,301 | 6/1982 | Koutonen et al. | |
| 4,598,534 | 7/1986 | Rosenthal et al. | 53/587 X |
| 4,723,395 | 2/1988 | Koutonen | 53/215 X |

FOREIGN PATENT DOCUMENTS

| | | |
|---|---|---|
| 0110110 | 4/1988 | European Pat. Off. . |
| 0 499 285 A1 | 8/1992 | European Pat. Off. . |
| 0 574 679 A1 | 12/1993 | European Pat. Off. . |
| 2 449 037 A | 9/1980 | France . |
| 3004470 A1 | 8/1980 | Germany . |
| 3833988 | 5/1990 | Germany . |
| 3941727 | 6/1991 | Germany . |
| 4124239 | 9/1992 | Germany .................. 53/215 |
| 6056112 | 3/1994 | Japan .................. 53/587 |
| 1283458 | 7/1972 | United Kingdom .................. 53/211 |
| 2159489 | 12/1985 | United Kingdom . |

*Primary Examiner*—Linda Johnson
*Attorney, Agent, or Firm*—Finnegan, Henderson, Farabow, Garrett & Dunner, L.L.P.

[57] ABSTRACT

A wrapping table for receiving and rotating a round bale (10) to be wrapped in which a driveable endless belt (11) forms a support surface for supporting the round bale (10) and is provided with at least one support member (20, 21) arranged beneath the support surface. The support member is moveable so that the support surface is capable of being formed either with a trough-like shape or with a plane-like shape. A plurality of mutually spaced rolls are selectively moveable to shape the support surface. Additionally, a refuse packaging apparatus including such a wrapping table (8) is disclosed.

20 Claims, 3 Drawing Sheets

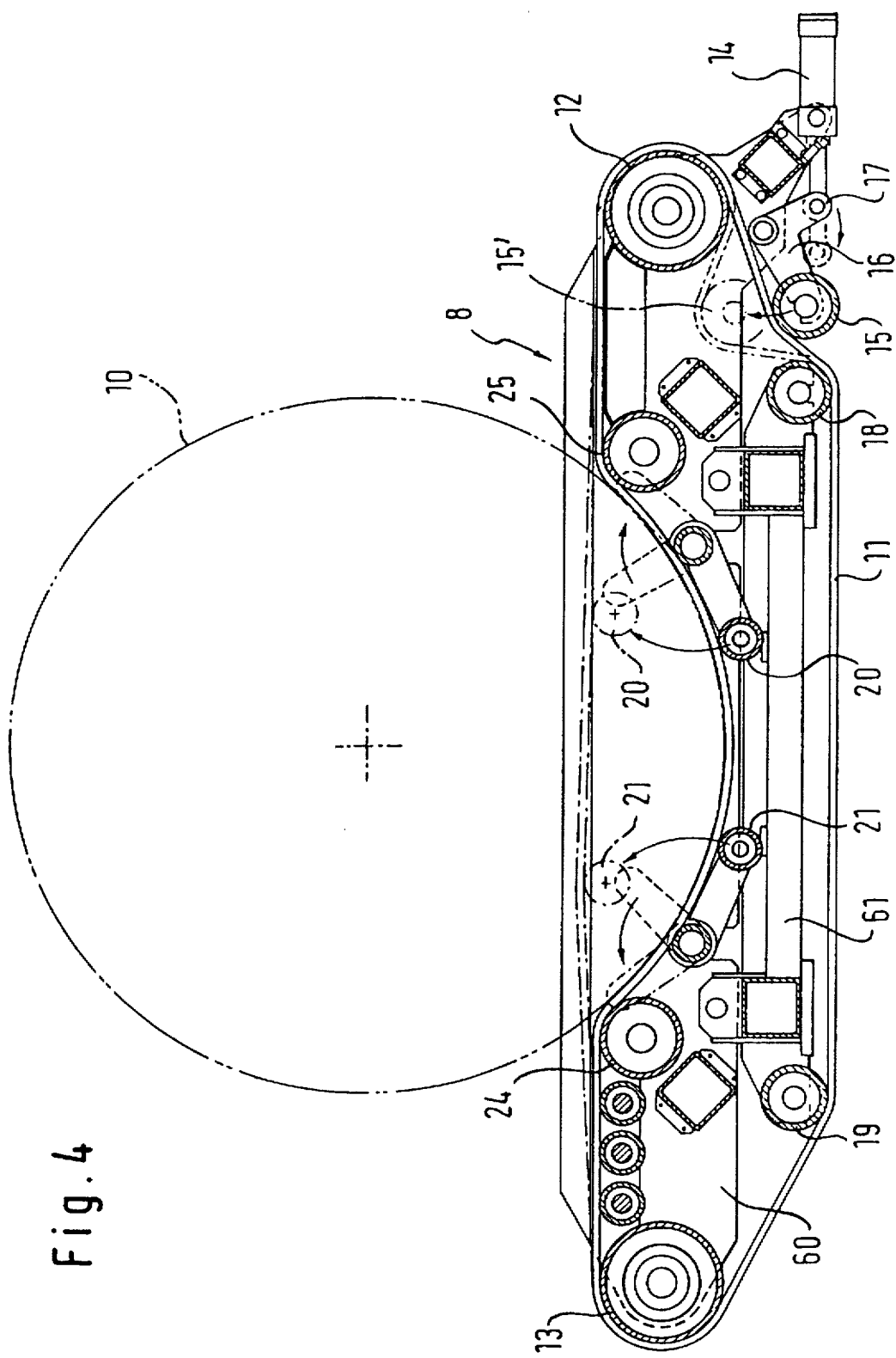

WRAPPING TABLE AND REFUSE PACKAGING APPARATUS

BACKGROUND OF THE INVENTION

The invention relates to a wrapping table for taking up and rotating a round bale to be wrapped and to a refuse packaging apparatus with such a wrapping table.

The transport, storage and disposal of refuse, in particular domestic refuse, biowaste, sewage slurry or other waste materials, can be optimized today in terms of space, time and quantity by means of pressing into cylindrical or cylindrical section-like refuse bales and complete wrapping in a foil. A wrapping table of the mentioned type can be used to wrap in an elastic foil a refuse bale which has been pressed, for example, in a round bale press. Such a wrapping table is operated together with a wrapping apparatus arranged above the table. Either the wrapping apparatus is rotatable so that the foil can be wrapped around the round bale while the bale is rotated about its cylindrical axis on the wrapping table, or the wrapping table rotates about a vertical axis of rotation and the round bale is simultaneously rotated about its horizontal axis on the wrapping table.

The use is known in agriculture of a silage bale wrapper in which hay, grass or the like in the form of a pressed round bale is completely wrapped in an elastic foil. For example, a silage bale wrapper provided as an add-on implement for a tractor is disclosed in DE-PS 38 33 988 and comprises a wrapping table consisting of a device arranged parallel to the ground for taking up off the ground a silage bale which lies with its peripheral surface on the ground to support and rotate the bale about its cylindrical axis. The wrapping table is formed of a plurality of cylindrical, rotatable round bars on a circular arc as seen in cross section and lying on the peripheral surface of a bale in the longitudinal direction, wherein the bars support the bales along lines parallel to the axis of the peripheral surface. On account of the preset receiving troughs for the round bales formed by the rotatable round bars, the taking up of the wrapped round bale as well as the discharge thereof does not take place without jolts. As a result, a round bale fed to a round bale press and merely wrapped around its peripheral surface with a netting web can lose material during the process of placing it on the wrapping table. During removal from the wrapping table, the risk of damaging the applied foil is increased.

In particular, in wrapping a round bale pressed from refuse articles, soiling on account of loss of material during the taking up process and damage to the foil during the removing process is to be avoided. The damage to the foil would prohibit storage of the refuse wrapped therein on an unsealed storage site because polluting substances would possibly otherwise seep into the ground or escape from the wrapped but damaged round bale.

SUMMARY OF THE INVENTION

The invention is based on the technical problem of providing a wrapping table and a refuse packaging apparatus by means of which the material loss from a pressed round bale or the damage of the foil serving to wrap up the pressed round bale is avoided.

This technical problem is solved by a wrapping table for taking up and rotating a round bale to be wrapped with a foil, which table is provided with a driven endless member that forms a support surface for supporting the round bale and in which at least one supporting element arranged beneath the support surface is moveable such that the support surface can also be formed to be trough-shaped, or in which a plurality of spaced rolls are provided which are move able to form a support surface also capable of being formed with a trough-like shape.

The invention is based on the concept of receiving and discharging a round bale in a smooth and jolt-free manner by means of a controlled alteration of the support surface. As a result of the fact that the support surface is substantially flat to receive the round bale and a trough-shaped depression is then provided, for example, by lowering at least one of the support elements arranged there beneath, the round bale placed on the support surface can be transferred in a very smooth and controlled manner into the necessary rotational position for wrapping in the foil. In this case, the endless member carries out two functions. On the one hand, the driven belt is used during the taking up step as well as during the discharging step to transport the refuse bale into the middle of the wrapping table. On the other hand, on account of the trough-shaped depression, the round bale is securely held in a position for rotation and, by driving the endless member, set into a rotational movement about its cylindrical axis, resulting in a complete wrapping in the foil. In the arrangement only with rolls spaced from each other, the take-up and discharge of a round bale takes place by driving at least one roll and lowering or pushing up a number of the rolls arranged in the middle of the wrapping table to different extents.

A very simple embodiment of the endless member is an endless belt, in particular a conveyor belt. Chain conveyor belts or the like can also be used.

In view of the support element being a support roll which is supported to be capable of being raised and lowered, the support surface formed by the endless member can be easily deformed in a desired manner.

An advantageous embodiment is characterized in that the support member lies against the lower moving side opposite the support surface and is pivotable about a point of rotation arranged a distance from the axis of rotation of the roll. Thus, after the taking up and discharging step, the round bale on the support surface can be transferred in a jolt-free manner into the trough-shaped depression necessary for wrapping with the foil. As a result of the pivoting of the support roll, the position of support moves towards the middle of the wrapping table so that the round bale is transferred in a slow and controlled manner into the simultaneously formed trough-shaped depression of the endless member.

With simple technical means, the trough-shaped depression can be formed in a controlled manner by at least one operating cylinder, in particular a pneumatically or hydraulically actuatable operating cylinder.

As a result of two spaced support members being arranged beneath the support surface, the pivoting axes of which are arranged at mutually opposite sides, it is possible for the first time to more gently insert the round bale into and remove it out of the trough-shaped depression. Since the support members are moveable independently of each other, during the inserting step, the support member facing the inserting direction can be lowered first, on account of which the round bale placed on the support surface safely sits in a small depression until the second support member is lowered. By raising the support member facing away from the removal direction, a smooth rolling out movement of the round bale sitting on the support surface takes place and the round bale is additionally supported by movement of the other support element during this.

The endless member or endless belt can be elastic. On account of the sometimes very large masses of the pressed round bales, however, it is advantageous if the endless belt does not have a very high elasticity. In such an embodiment, at least one length compensating device for the endless belt is very advantageous.

A preferred embodiment of the length compensating device has at least one moveable tensioning roll lying against the support surface.

By controlling the length compensating device in dependence on the position of the support member, the desired tensioning of he endless belts around the deflection rolls is possible in dependence on the trough-shaped formation.

A further preferred embodiment of the wrapping table has a lower stationary and an upper moveable frame between which at least one measuring element is arranged to measure the bearing load. As a result of this embodiment, the weight of the round bale can be measured during the taking up and the removing steps.

It is particularly preferred that a measuring element is arranged at each of several spaced positions, the trough-shaped depression being formable between the measuring elements. As a result of this, on the one hand, the weight of the round bale n the endless belt can be measured. On the other hand, however, as a result of the different positions of the measuring elements and the different weight loads acting thereon, the position of the round bale on the supporting belt can be exactly determined and the movement of the support member can be controlled in dependence on the detected position.

By using measuring elements in the form of wire strain gauge weighing cells, a cheap and reliable detection of the weight loads and of the position of the round bale on the endless belt is possible.

As a result of the entire wrapping table being horizontally moveable, the transfer of a round bale from a pressing station to a wrapping station as well as the transfer from the wrapping station to a delivery station takes place with one and the same wrapping table.

Advantageously, angle decoders are arranged on the crossbeam and the wrapping table. The parameters necessary to adjust the amount of foil overlap can be detected by means of these angle decoders. However, it is additionally possible on account of this to exactly fix the location for cutting the foil so that the trailing edge of the foil still to be applied onto the round bale ends in a predetermined manner at a precisely defined position. Further, the arrangement of the angle decoders permits the exchanging position for a new foil roll to be exactly set. For example, an automatic exchange of a foil roll can therefore take place in a preselected position.

In particular, an incremental angle decoder is mounted on a drive motor of the crossbeam and measures the number of revolutions of the motor and, therefore, the rotational speed of the crossbeam. The alteration of the rotational speed of the crossbeam takes place by means of the incremental angle decoder in a closed cycle. The further angle decoder on the wrapping apparatus is an absolute pickup which is mounted directly on the rotational axis of the crossbeam and signals the position of the crossbeam to the control means. In this manner, it is possible after the wrapping process to cut the foil at any desired suitable position of the bale and to press down and adhere the foil ends by rotating the round bale about a further half turn. Following use of the foil roll, the absolute pickup makes it possible to rotate the crossbeam into a defined foil roll exchange position. An incremental angle decoder and an absolute pickup are also mounted in a corresponding manner on the wrapping table.

An inventive refuse packaging apparatus for pressing refuse into the form of a round bale and for wrapping it with a foil has a feed station, a pressing station, a wrapping station with a wrapping table comprising one or more of the described features and a delivery station and a control station.

It is possible with the aid of such a refuse packaging apparatus to achieve a substantially loss-free pressing of refuse into the shape of a round bale and to completely wrap it in an elastic foil. Additionally, on account of the design of the wrapping table in the described manner, a gentle handling of the round bale wrapped with the foil is possible.

Finally, on account of the horizontally moveable design of the wrapping table, an increase in the cycle rate is possible.

BRIEF DESCRIPTION OF THE DRAWINGS

For better explanation and understanding of the invention, an exemplary embodiment is described and explained in more detail in the following with reference to the enclosed drawings, in which:

FIG. 4 shows a side view of the side of the inventive wrapping table opposite that illustrated in FIG. 3.

DETAILED DESCRIPTION OF THE PREFERRED EMBODIMENTS

Figure 1:
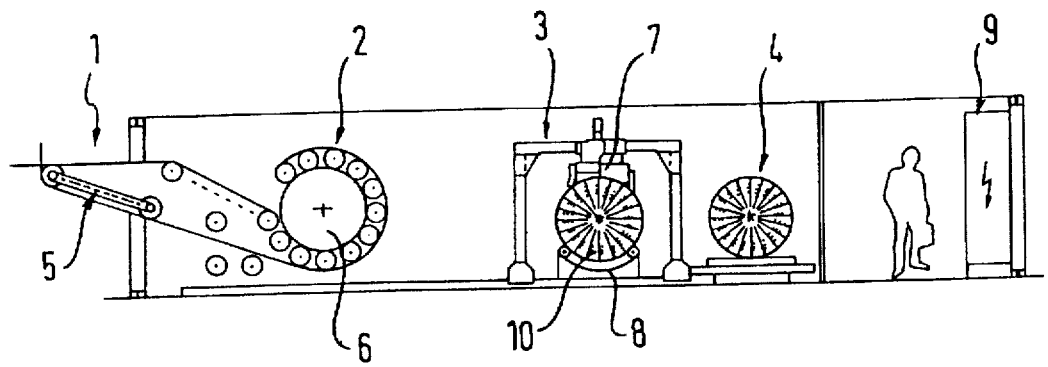
FIG. 1 shows a schematic side view of a refuse packaging apparatus which is equipped with a wrapping table according to the invention.

A schematic side view of a refuse packaging apparatus is illustrated in FIG. 1. The refuse packaging apparatus has at the inlet side a feed station 1 for the refuse to be packaged.

The feed station 1 is provided with a refuse feeding conveyor belt 5. Adjoining the feed station 1 is a pressing station 2 comprising a round bale press 6. The pressing station 2 is followed by a wrapping station 3 which essentially consists of a foil wrapping device and a wrapping table 8. Arranged beyond the wrapping device is a delivery station 4 from which a round bale completely wrapped with a foil in the wrapping station 3 can be removed. Control devices 9 for controlling the previously mentioned devices are also schematically shown in the schematic side view illustrated in FIG. 1.

Figure 2:
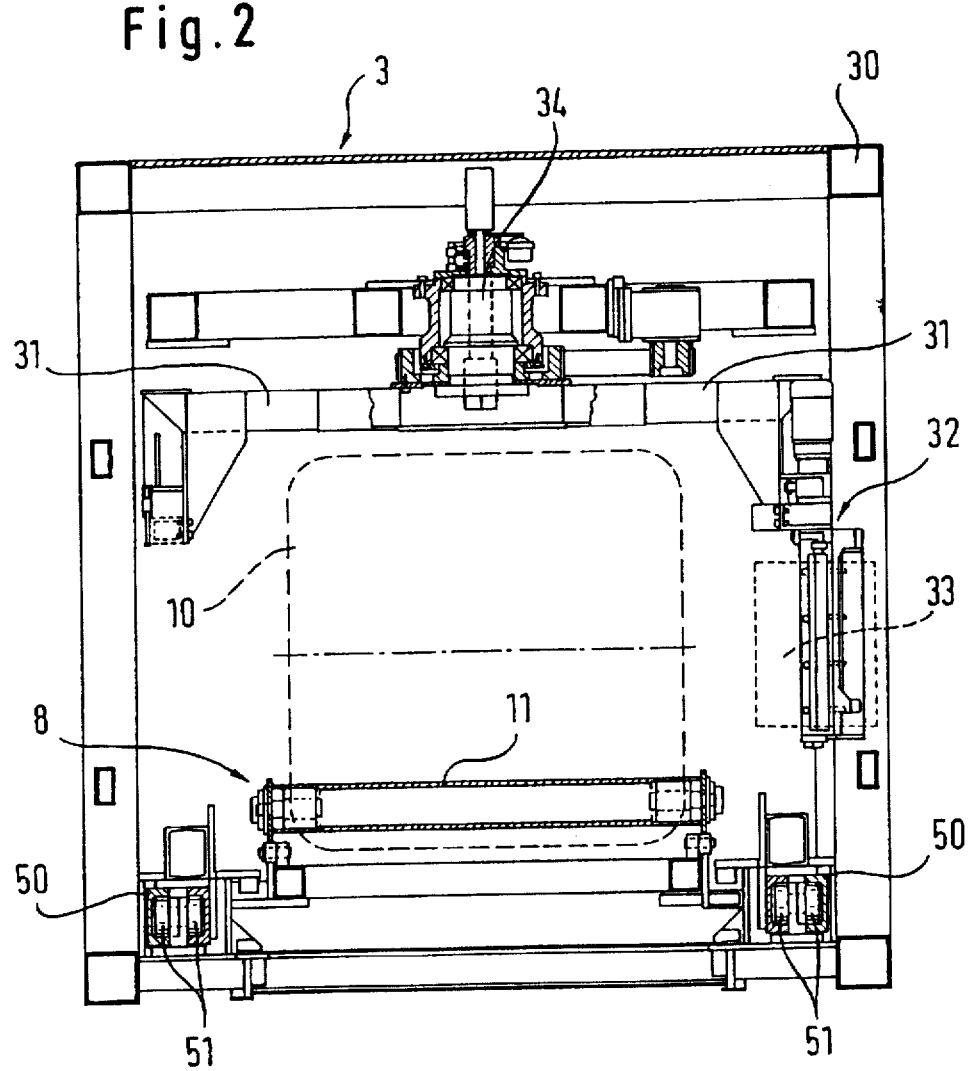
FIG. 2 shows a schematic cross section of a wrapping station with the wrapping table according to the invention.

A detailed cross section of the wrapping station 3 is shown in FIG. 2. In a frame 30, there is a crossbeam 31 rotatably supported about a centre axis. At each end of the crossbeam 31 there is a foil roll holder 32 in which a foil roll 33 can be rotatably mounted. Beneath the crossbeam 31, there is a wrapping table 8 supported on rolls 51 to be displaceable along rails 50. The wrapping table 8 comprises an endless belt 11 upon which a round bale 10 can be placed which is discharged from the pressing station 2 with a peripheral surface thereof wrapped in a netting web.

Figure 3:
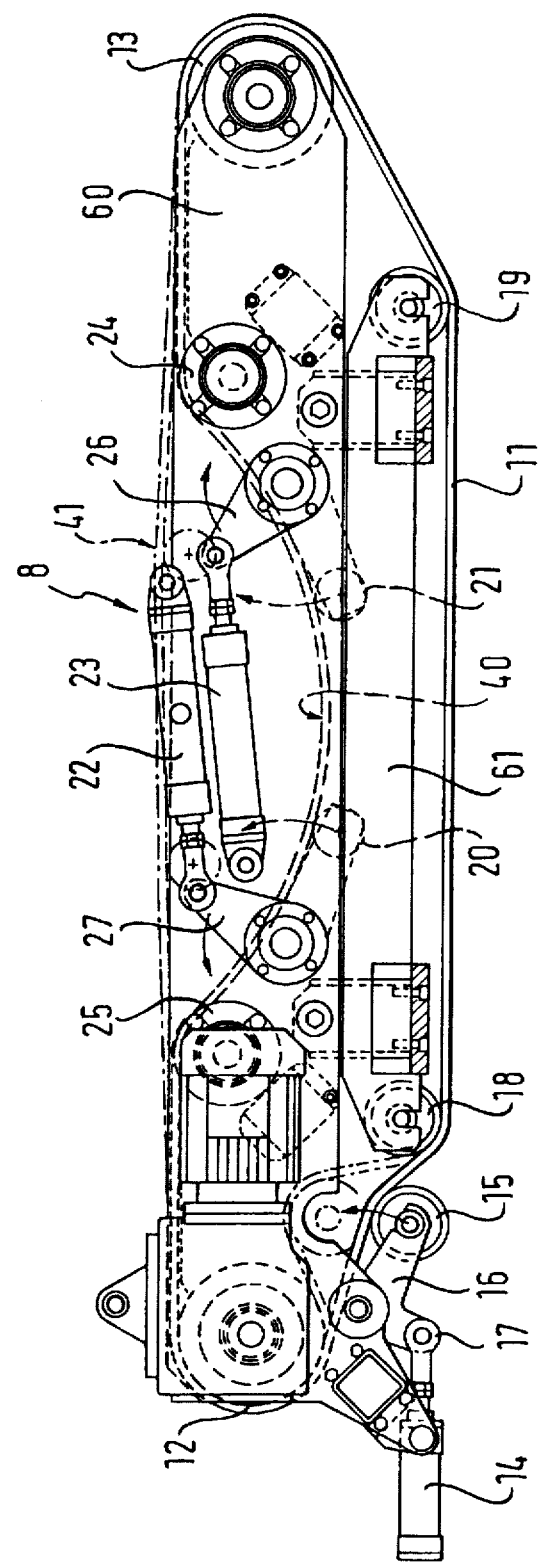
FIG. 3 shows a schematic side view of a wrapping table according to the invention.

The structure of the wrapping table 8 can be more easily understood with respect to the following FIGS. 3 and 4.

FIG. 3 shows a schematic side view of the wrapping table 8. The endless belt 11 passes over two deflection rolls 12, 13, one of which is driven. Between the two deflection rolls 12 and 13, there are two spaced, stationary support rolls 24, 25. Between these two support rolls 24, 25 at the lower side of the endless belt 11 opposite the support surface, there are two moveable and pivotable support rolls 20, 21. Each of the support rolls 20, 21 is provided at each end face respectively with an L-shaped pivot lever 26, 27. The support rolls 20, 21 are respectively rotatably supported at one end of the respective pivot levers 26, 27. An operating cylinder 22, 23 is respectively mounted at the other ends of the pivot levers 26, 27.

The deflection rolls 12, 13, the further support rolls 24, 25 and the pivotable support rolls 20, 21 with the associated pivot levers 26, 27 and operating cylinders 22 and 23, respectively, are mounted on an upper frame 60.

On a lower frame 61, there are lower deflection rolls 18, 19 and a length compensating device. The length compensating device comprises a tension roll 15 rotatably mounted on an L-shaped pivot lever 16, the tension roll lying against the outer side of the endless belt 11. An operating cylinder 14 is mounted by means of a hinged connection 17 to an end of the L-shaped pivot lever 16.

A schematic side view of the wrapping table 8 according to FIG. 3 as seen from the other side is illustrated in FIG. 4. The upper frame 60 and the lower frame 61 are easily recognizable in this illustration. The upper frame 60 is supported to be vertically displaceable with respect to the lower frame 61. Between the two frames 60, 61, there are four wire strain gauge weighing cells. The wire strain gauge weighing cells are located at four opposing corners outside the trough-shaped depression of the endless belt 11, which is capable of being formed by the pivotable support rolls 20, 21.

The mode of operation of a refuse packaging apparatus according to FIG. 1 and, in particular, that of the wrapping table 8 is described in more detail in the following.

Refuse is placed on the refuse feed conveyor belt 5 of the feed station 1. The refuse feed conveyor belt 5 transports the refuse thereon into the interior of the round bale press 6 of the pressing station 2. In this, a cylindrical round bale 10 is pressed during further conveyance of the refuse A wrapping of the pressed round bale 10 with a netting web about the peripheral surface of the bale then takes place in the pressing station 2. As soon as this process has been completed, the wrapping table 8 is driven from the wrapping station 3 to the pressing station 2 on the rollers 51. Subsequently, the round bale press 6 is opened. The support rolls 20, 21 are swung upwardly at this point in time so that a flat or even slightly inclined support surface is formed by further raising the support roll 21 distal from the pressing station 2. By opening the round bale press 6, the round bale rolls smoothly onto the endless conveyor belt 11. As soon as the round bale lies on the endless belt 11, the belt 11 is set in motion so that the round bale 10 is transported to the middle of the wrapping table 8. With the aid of the wire strain gauge weighing cells, it can be detected when the refuse bale is located in the middle of the wrapping table. During the transport of the round bale, the pivotable support rolls 20, 21 are slowly swung downwards by means of the operating cylinders 22, 23 so that a trough-shaped depression is formed. Simultaneously to the swinging of the support rolls 20, 21, the operating cylinder 14 of the length compensating device is displaced so that the endless belt 11 is kept in tension on account of the pivoting of the tension roll 15. The lowering of the round bale takes place very smoothly on account of the control of the support rolls 20, 21, of the speed of the endless belt 11 and of the adjustment of the length compensating device.

If the round bale 10 is partially surrounded at its peripheral surface by the endless belt 11 in the formed trough-shaped depression 40, the endless belt 11 is set in motion again so that the round bale 10 located thereon is rotated about its horizontal axis in the formed trough. During this process, the crossbeam 31 of the wrapping apparatus 7 is rotated so that a complete wrapping of the round bale 10 with a foil, as known per se, takes place around its peripheral surface and its end faces. As soon as the desired wrapping of the round bale 10 has occurred, the foil is cut. Subsequently, the wrapping table 8 together with the now completely wrapped round bale 10 is moved to the delivery station 4. The delivery station 4 comprises one or more driven conveyor belts extending perpendicular to the direction of movement of the wrapping table 8. By swinging the support rolls 20, 21 with the aid of the operating cylinders 22, 23, the round bale 10 thereon can then be very smoothly placed onto the conveyor belt or belts of the delivery station 4. In this regard, it is to be noted that a very smooth delivery of thee round bale 10 takes place on account of the subsequent lateral swinging away of the support roll 21 closer to the delivery station 4 as compared to the support roll 20.

In the delivery station 4, the round bale is transported to one side of the apparatus and can be removed from there with gripping devices or the like.

By means of the measurement values obtained with the wire strain gauge weighing cells, the weight or the round bale thereon can be calculated. This data can be transferred to further control devices for further processing.

I claim:

1. A wrapping table for receiving and rotating a round bale to be wrapped with a foil, comprising
   at least two spaced stationary deflection rolls,
   a driveable endless member having a support surface for supporting the round bale and passing around the at least two stationary deflection rolls,
   at least one moveable support member under the support surface and between the at least two stationary deflection rolls, and
   means for moving the at least one moveable support member to shape the support surface into one of a plane-like shape and a trough-like shape.

2. A wrapping table for receiving and rotating a round bale to be wrapped with a foil, comprising
   at least two spaced stationary deflection rolls,
   a drivable endless member having a support surface for supporting the round bale and passing around the at least two stationary deflection rolls,
   a plurality of mutually spaced rolls between the at least two stationary deflection rolls, at least some of the mutually spaced rolls being moveable, and
   means for moving the moveable mutually spaced rolls to shape the support surface into one of a plane-like shape and a trough-like shape.

3. A wrapping table according to claim 1 or 2, wherein the endless member is an endless belt trained around the at least two stationary deflection rolls, at least one of the at least two stationary deflection rolls being driveable.

4. A wrapping table according to claim 1, wherein the at least one support member lies against a lower side of the endless member, opposite the support surface, and is pivotable about an axis through an arc of rotation spaced from the axis.

5. A wrapping table for receiving and rotating a round bale to be wrapped with a foil, comprising
   at least two spaced stationary deflection rolls,
   a driveable endless member having a support surface for supporting the round bale and passing around the at least two stationary deflection rolls, and at least one support member under the support surface and between the at least two stationary deflection rolls, the support member being moveable to shape the support surface into one of a plane-like shape and a trough-like shape, wherein the support member is moveable by at least one operating mechanism.

6. A wrapping table according to claim 5, wherein the operating mechanism is a fluid actuated expansible chamber device.

7. A wrapping table according to claim 6, wherein the expansible chamber device is an hydraulically actuated operating cylinder.

8. A wrapping table according to claim 6, wherein the expansible chamber device is an pneumatically actuated operating cylinder.

9. A wrapping table according to claims 1 or 2 wherein at least one length compensating device is provided on the wrapping table to compensate for a change in length of the support surface.

10. A wrapping table according to claim 1, including at least one length compensating device actuable in dependence on the position of the support member.

11. A wrapping table according to claim 9, wherein the length compensating device comprises at least one moveable tension roll lying against the support surface.

12. A wrapping table according to claim 11, wherein the tension roll has a rotational axis and is pivotable by an operating cylinder about a pivotal axis spaced at a distance from the rotational axis of the tension roll.

13. A wrapping table according to claims 1 or 2, wherein the wrapping table comprises a lower stationary frame, an upper moveable frame, and at least one measuring element arranged between the frames for measuring weight of the bale.

14. A wrapping table according to claim 13, including a plurality of measuring elements respectively arranged at spaced positions, the trough-like shape being formable between the measuring elements.

15. A wrapping table according to claim 14, wherein the support member is arranged between the measuring elements.

16. A wrapping table according to claim 13, wherein the moveable support member is arranged on the upper frame.

17. A wrapping table according to claim 13, wherein the measuring element is a wire strain gauge weighing cell.

18. A wrapping table according to claims 1 or 2, wherein the wrapping table is horizontally moveable.

19. A wrapping table according to claim 18, wherein the wrapping table is moveable on rails by rollers.

20. A refuse packaging apparatus comprising:

a pressing station for pressing domestic refuse, biowaste, sewage slurry or other waste materials, into the form of a round bale, a wrapping station following the pressing station, the wrapping station including a wrapping apparatus for wrapping the pressed round bale with a foil and a wrapping table including at least two spaced stationary deflection rolls, a driveable endless member having a support surface for supporting the round bale and passing around the at least two stationary deflection rolls, at least one moveable support member under the support surface and between the at least two stationary deflection rolls, and means for moving the at least one moveable support member to shape the support surface into one of a plane-like shape and a trough-like shape, and a delivery station arranged beyond the wrapping station.

* * * * *